United States Patent
Ewer et al.

(10) Patent No.: US 7,223,925 B2
(45) Date of Patent: *May 29, 2007

(54) RACEWAY FITTING WITH OR WITHOUT FITTING BASE

(75) Inventors: Stephen Ewer, Milford, CT (US); David McBain, Rancho Murieta, CA (US); Gary W. Bateson, Mystic, CT (US)

(73) Assignee: Hubbell Incorporated, Orange, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/141,038

(22) Filed: Jun. 1, 2005

(65) Prior Publication Data

US 2005/0217883 A1    Oct. 6, 2005

Related U.S. Application Data

(60) Division of application No. 10/888,579, filed on Jul. 12, 2004, now Pat. No. 6,909,044, which is a division of application No. 09/996,612, filed on Nov. 30, 2001, now Pat. No. 6,938,337, which is a division of application No. 09/784,333, filed on Feb. 16, 2001, now Pat. No. 6,344,611, which is a continuation of application No. 09/521,674, filed on Mar. 8, 2000, now abandoned.

(51) Int. Cl.
    *H02G 3/10* (2006.01)
(52) U.S. Cl. ............ 174/481; 174/492; 174/68.3; 174/72 C; 174/97; 52/220.5; 52/220.7; 52/718.04; 385/100

(58) Field of Classification Search .............. 174/48, 174/49, 68.3, 71 R, 72 A, 72 C, 72 R, 95, 174/96, 97, 99 R, 101, 480, 481, 492; 52/220.5, 52/220.7, 718.04; 248/200.1; 385/100, 385/134

See application file for complete search history.

(56) References Cited

U.S. PATENT DOCUMENTS 686,052 A    11/1901    Golding (Continued)

FOREIGN PATENT DOCUMENTS

GB    1493410    11/1997

(Continued)

OTHER PUBLICATIONS

Hubbell Premise Wiring Full Line Catalog; pp. 1-3, 136-139 and 143-147; prior to Mar. 8, 2000.

(Continued)

*Primary Examiner*—Angel R. Estrada
(74) *Attorney, Agent, or Firm*—Garrett V. Davis; Mark S. Bicks; Alfred N. Goodman

(57) ABSTRACT

A cover fitting for connecting more than one raceway includes an L-shaped top having first and second curved grooves extending along the inner surface of the top and a plurality of hooks extending outwardly from the inner surface for engaging a portion of each raceway base. The cover fitting further includes first and second opposing sides extending from the inner surface of the top. The cover fitting can be used with a fitting base received in first and second grooves for situations requiring a specific bend radius, or in applications without a fitting base, where there are no bend radius requirements.

13 Claims, 9 Drawing Sheets

U.S. PATENT DOCUMENTS

| | | |
|---|---|---|
| 3,532,369 A | 10/1970 | Reilly .................... 403/176 X |
| 3,782,420 A | 1/1974 | Kolb et al. .................. 138/156 |
| 4,308,418 A | 12/1981 | Van Kuik et al. ............. 174/48 |
| 4,319,075 A | 3/1982 | Willette .................... 29/868 X |
| 4,423,284 A | 12/1983 | Kaplan ........................ 174/101 |
| 4,951,716 A | 8/1990 | Tsunoda et al. ............ 138/162 |
| 5,057,981 A | 10/1991 | Bowen et al. .............. 362/219 |
| 5,091,607 A | 2/1992 | Stob ............................ 174/48 |
| 5,161,580 A | 11/1992 | Klug ........................... 138/92 |
| 5,390,968 A | 2/1995 | Favalora .................... 285/179 |
| 5,394,502 A | 2/1995 | Caron ........................ 385/134 |
| 5,469,893 A | 11/1995 | Caveney et al. ............ 138/162 |
| 5,753,855 A | 5/1998 | Nicoli et al. ................. 174/49 |
| 5,917,982 A | 6/1999 | Vargas et al. .............. 385/134 |
| 5,929,380 A | 7/1999 | Carlson, Jr. et al. ....... 174/68.3 |
| D413,306 S | 8/1999 | Scherer et al. ............. D13/155 |
| 6,002,087 A | 12/1999 | Albert et al. .................. 174/48 |
| 6,002,089 A | 12/1999 | Hemingway et al. .......... 174/97 |
| 6,037,543 A | 3/2000 | Nicoli et al. .............. 174/72 R |
| 6,156,977 A | 12/2000 | Benito-Navazo .............. 174/97 |
| 6,188,024 B1 | 2/2001 | Benito-Navazo .............. 174/97 |
| 6,284,975 B1 | 9/2001 | McCord et al. ........... 174/71 R |

FOREIGN PATENT DOCUMENTS

JP         6111643        4/1994

OTHER PUBLICATIONS

Hubbell Incorporated Wiring Device Kellems Instruction Sheets; pp. 1-2; Nov. 1999.

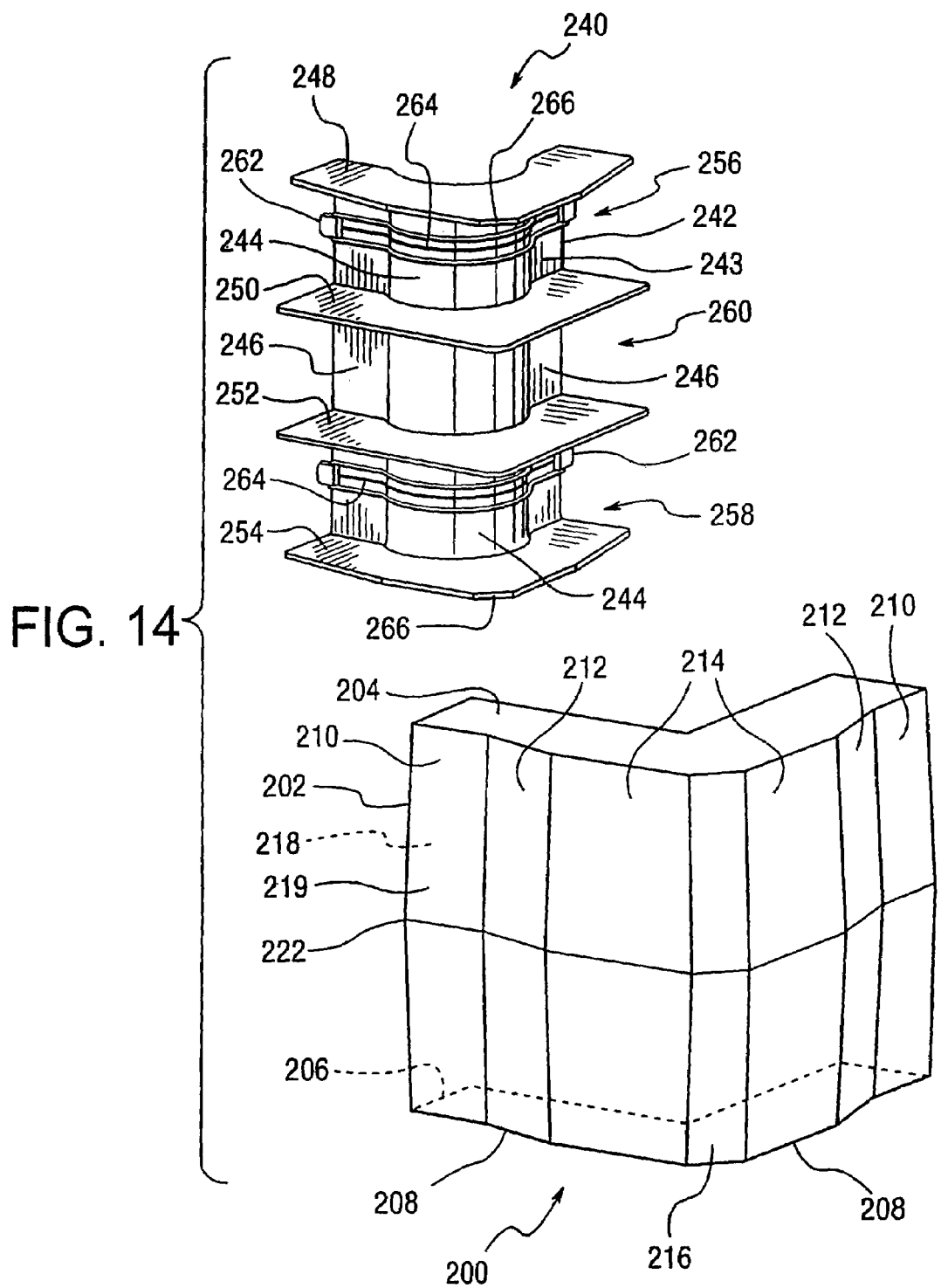

RACEWAY FITTING WITH OR WITHOUT FITTING BASE

RELATED APPLICATIONS

This application is a divisional application of Ser. No. 10/888,579, filed Jul. 12, 2004, now U.S. Pat. No. 6,909,044, which is a divisional application of Ser. No. 09/996,612, filed Nov. 30, 2001, now U.S. Pat. No. 6,938,337 which is a divisional application of Ser. No. 09/784,333, filed Feb. 16, 2001, now U.S. Pat. No. 6,344,611, which is a continuation of application Ser. No. 09/521,674, filed Mar. 8, 2000, now abandoned.

FIELD OF THE INVENTION

The present invention relates to wire delivery systems, such as a raceway, and fittings used for connecting more than one raceway. In particular, the fittings are formed of various elbows and tees to allow the wire delivery system to easily manage corners of a room.

BACKGROUND OF THE INVENTION

Wire delivery systems, such as raceways, are employed to hold and manage wires, such as voice, data, and power wiring. Specifically, the raceway is mounted to a supporting surface, such as a wall or ceiling, and the raceway distributes the wires carried therein throughout a room. Fittings, such as interior and exterior elbows and tees, are used to connect more than one raceway, especially when negotiating corners of the room. This provides efficient delivery and management of the wiring throughout a room while hiding the unattractive wires.

Particular types of wiring, fiber optic or category 5 cable, can require certain bend radii when the direction of the wiring changes, such as at a corner of a room. As a result, it is necessary to make and use special fittings that add a curved base having the appropriate bend radius to avoid damage to the wires or cables. Commonly, one type of raceway fitting is used for wire or cable needing a specific bend radius while another is used when the wire or cable does not need a specific bend radius. This type of situation increases costs and is inefficient.

Examples of prior art fittings are disclosed in the U.S. Pat. Nos. 6,002,089 to Hemingway et al.; 5,753,855 to Nicoli et al.; 5,390,968 to Favalora; 5,469,893 to Caveney et al.; 5,929,380 Carlson, Jr. et al.; 5,161,580 to Klug; 4,951,716 to Tsunoda et al.; and D413,306 to Scherer et al. and U.K. Patent No. 1,493,410.

SUMMARY OF THE INVENTION

Accordingly, an object of the invention is to provide an improved raceway fitting that is cost effective and efficient to use.

Another object of the present invention is provide a raceway fitting that can be employed in applications needing a curved base or applications not requiring a curved base.

Yet another object of the present invention is provide a raceway fitting that can be used with a mitered connection between raceways or with a curved adapter.

The foregoing primary object is basically attained by a cover fitting for a raceway, comprising a top having inner and outer surfaces and first and second curved walls extending along the inner surface forming a first segment of a first groove for receiving a first partition of a raceway base fitting covered by the cover fitting. The top further includes a plurality of securing members extending outwardly from its inner surface for engaging a portion of a raceway base. The cover fitting also has a first side extending outwardly from the inner surface and a second side extending outwardly from the inner surface remote from the first side.

The foregoing primary object is also attained by a method of connecting two substantially identical cover fittings to a raceway wherein said two substantially identical cover fittings include first and second cover fittings, each of the first and second cover fittings have a top and opposing first and second sides. The method comprises the steps of placing the first cover fitting over a junction point of two raceway bases, the junction point being a miter joint and placing the second cover fitting over a curved base fitting coupled between two raceway bases.

One benefit of the invention is that by designing the cover fitting in this fashion, it can be employed either with a base for accommodating wiring such as category 5 which mat require a specific bend radius, or without a base for wiring not requiring a specific bend radius. Therefore, the need for two separate cover fittings for each application is eliminated reducing manufacturing costs and increasing efficiency in employing a raceway delivery system.

Other objects, advantages and salient features of the invention will become apparent from the following detailed description, which taken in conjunction with the annexed drawings, discloses preferred embodiments of the invention.

BRIEF DESCRIPTION OF THE DRAWINGS

Referring to the drawings which form a part of this disclosure:

FIG. 14 is an exploded, front, top perspective view of the raceway fitting in FIG. 12, showing the fitting with a curved base.

DETAILED DESCRIPTION OF THE INVENTION

A wire delivery system comprises raceways 10 that hold wiring and a cover fitting 12, according to the present invention, connecting the two raceways 10, as seen in FIGS. 1–8. A base fitting 14, can alternatively be used with cover fitting 12 in applications, such as category 5 applications or fiber optic cables, that require a certain bend radius to prevent damage to the wiring.

Figure 1:
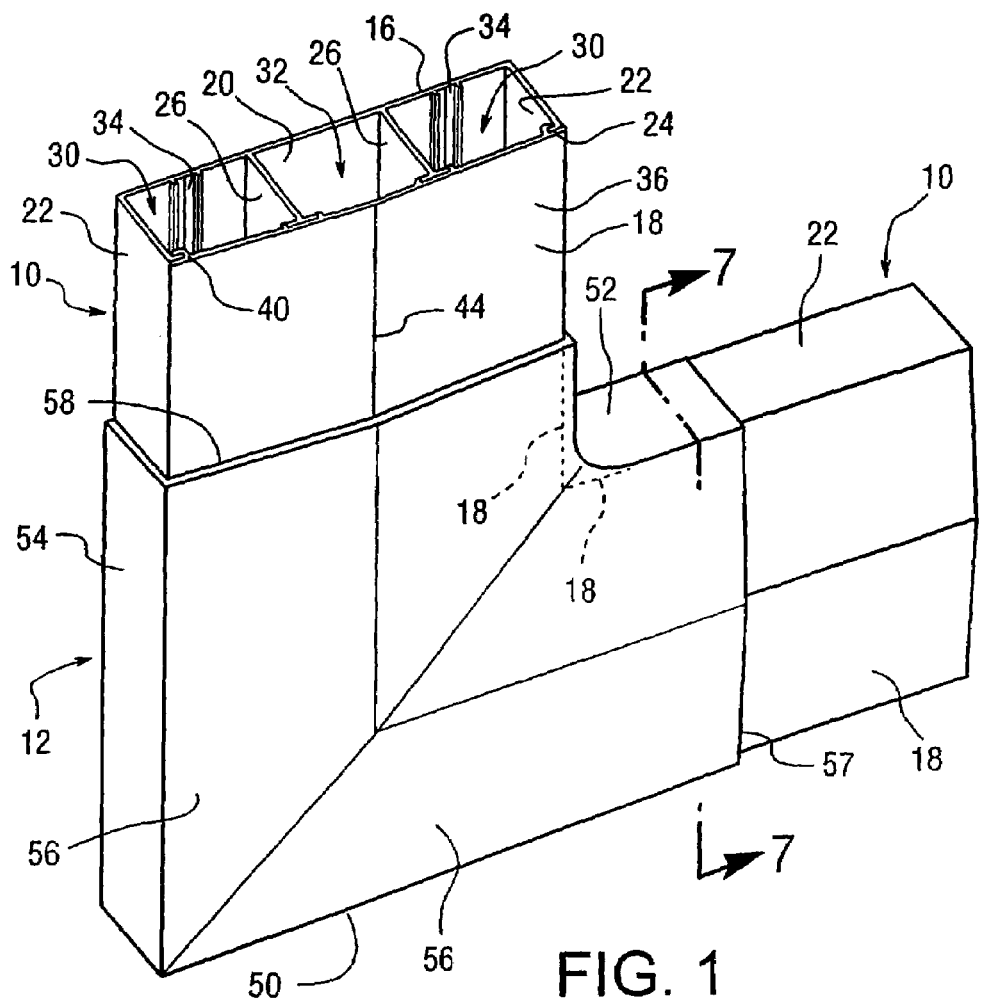
FIG. 1 is a top side perspective view of a raceway fitting according to a first embodiment of the present invention, illustrating the fitting assembled on two mitered raceways.
Figure 2:
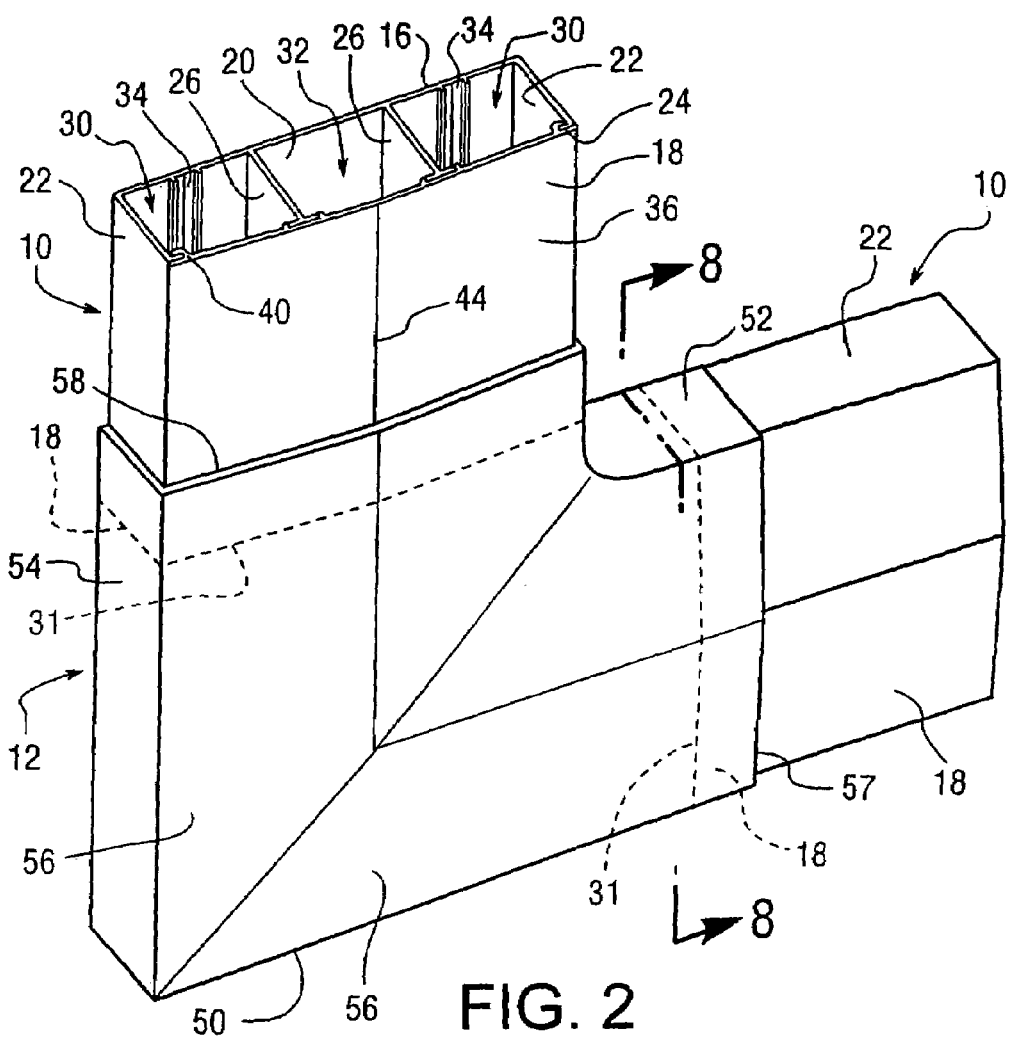
FIG. 2 is a top side perspective view of the raceway fitting illustrated in FIG. 1, but showing the fitting assembled with two non-mitered raceways with a raceway base located between the raceways and under the fitting.
Figure 3:
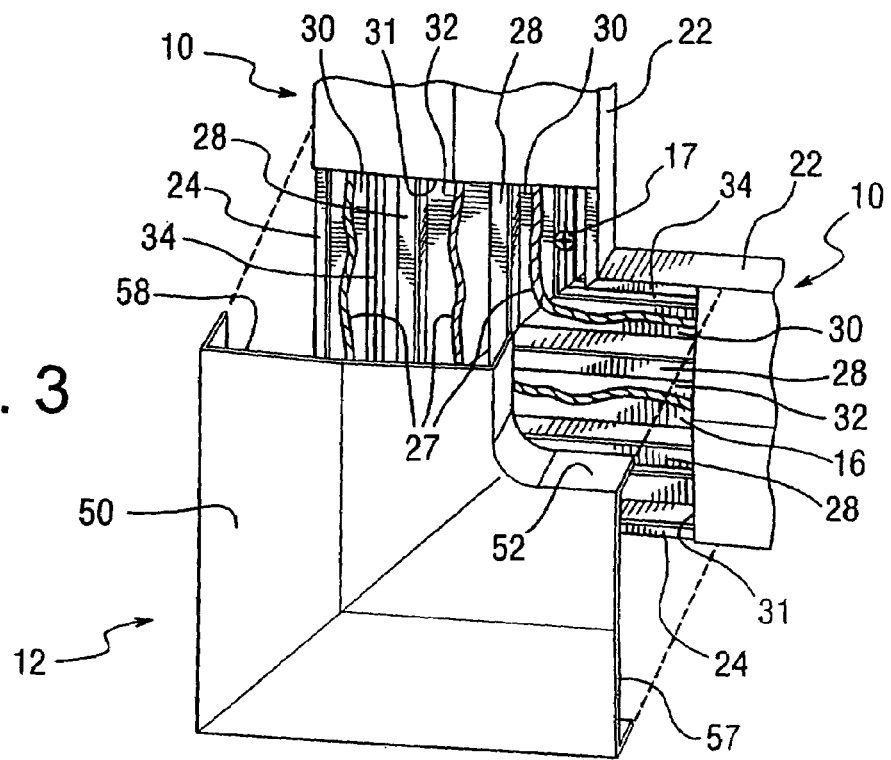
FIG. 3 is an exploded, front, side perspective view of raceway fitting in FIG. 1, showing the fitting being connected to two mitered raceways.
Figure 4:
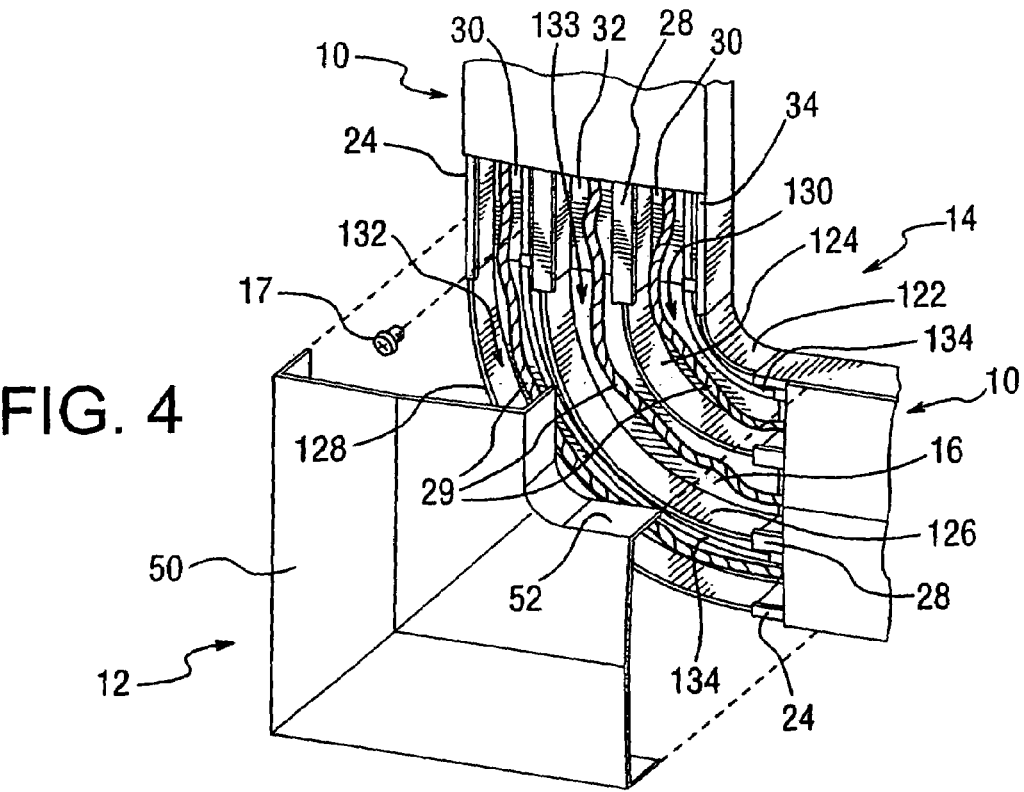
FIG. 4 is an exploded, front, side perspective view of raceway fitting in FIG. 2, showing the fitting being connected to two raceways with a base therebetween.

In particular, FIGS. 1 and 3 show cover fitting 12 connecting two mitered raceways 10 with their respective ends abutting one another forming a miter joint. Such an arrangement is employed when delivering power and/or voice wiring which do not require a certain bend radius when a change in direction occurs, such as non-category 5 applications. FIGS. 2 and 4 show cover fitting 12 alternatively being used to connect two non-mitered raceways 10 with their respective ends being spaced from one another with a curved base fitting 14 disposed therebetween and under cover fitting 12. Base fitting 14 provides a specific bend radius, for example, the appropriate bend radius for category 5 wiring. Although the assemblies shown in FIGS. 1 and 2 are the same, sectional views in FIGS. 7 and 8 clearly show the distinctions between the two figures, as will be discussed in detail below.

Raceway 10 is generally a plastic, elongated member that holds wiring to be delivered throughout a room, such as an office, protecting and hiding the unattractive wiring from view. Raceway 10 includes a raceway base 16 mounted to a surface by fasteners 17 with a raceway cover 18 attached thereto, forming an enclosure for holding the wiring. Specifically, raceway base 16 includes a bottom wall 20 and opposing sidewalls 22 extending perpendicularly from bottom wall 20 with each sidewall 22 having an inward lip 24 for engaging raceway cover 18, as seen in FIGS. 1 and 2. First and second dividing walls 26 also extend from bottom wall 20 equal distant from each sidewall 22, respectively, forming three channels, two outer channels 30 and a middle channel 22, each having substantially the same dimensions. The multi-channels allow raceway 10 to carry any combination of wiring, such as voice, data or power wiring. Each outer channel 30 each includes a track 34 that both connects to base fitting 14 and provides a guide for extending fastener 17 through raceway 10 when mounting raceway 10.

Figure 7:
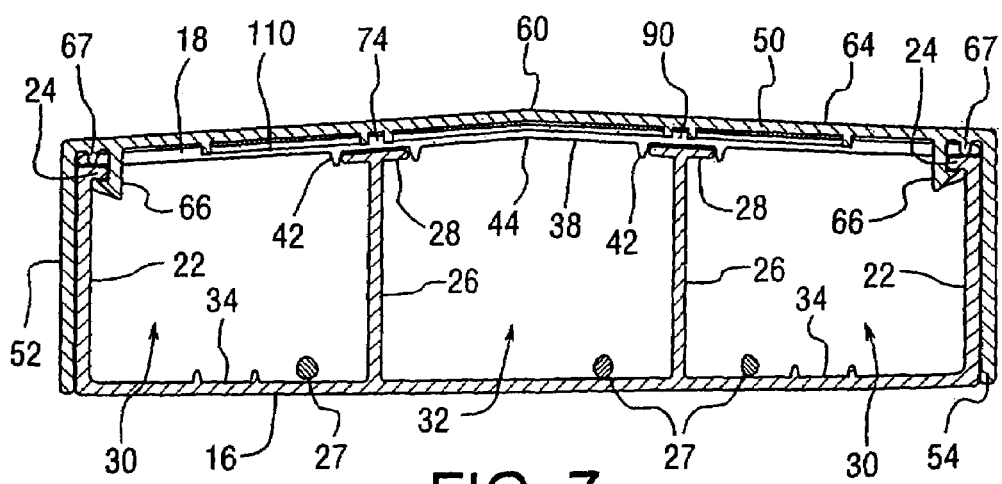
FIG. 7 is an enlarged cross-sectional view taken along line 7—7 in FIG. 1, showing the fitting engaged with a raceway.
Figure 8:
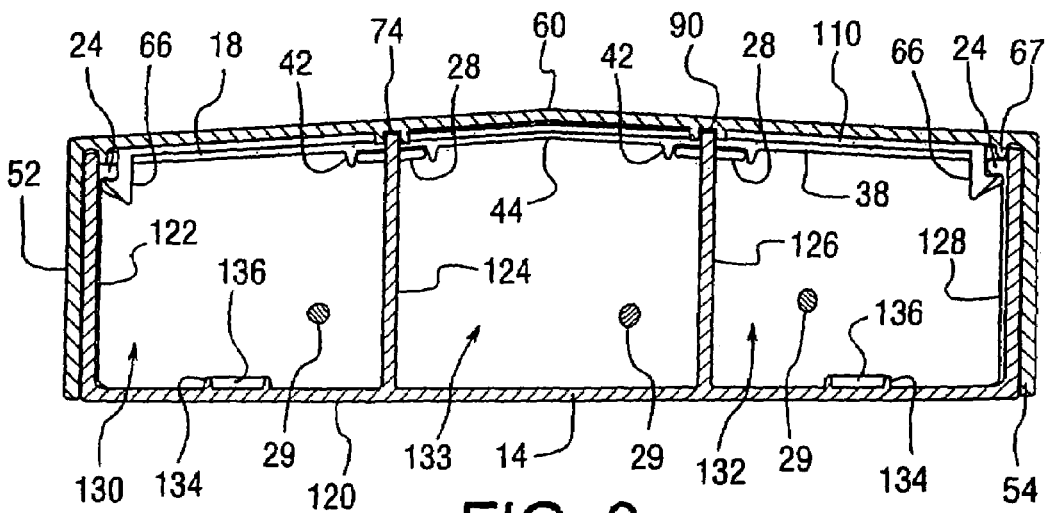
FIG. 8 is an enlarged cross-sectional view taken along line 8—8 in FIG. 2, showing the fitting engaged with a raceway with a base disposed therebetween.

Raceway cover 18 is connected to raceway base 16 by mounting raceway cover 18 on support members 28 disposed on the distal ends of dividing walls 26 of raceway base 16. In particular, raceway cover 18 includes upper and lower surfaces 36 and 38 with hooks 40 extending downwardly from lower surface 38 proximate each side of raceway cover 18. Hooks 40 correspond to and engage lips 24 of sidewalls 22 forming a separable connection with raceway base 16. Raceway cover 18 also includes cover tracks 42 that extend along lower surface 38 that correspond to and receive support members 28 of dividing walls 26, as best seen in FIGS. 7 and 8.

Figure 5:
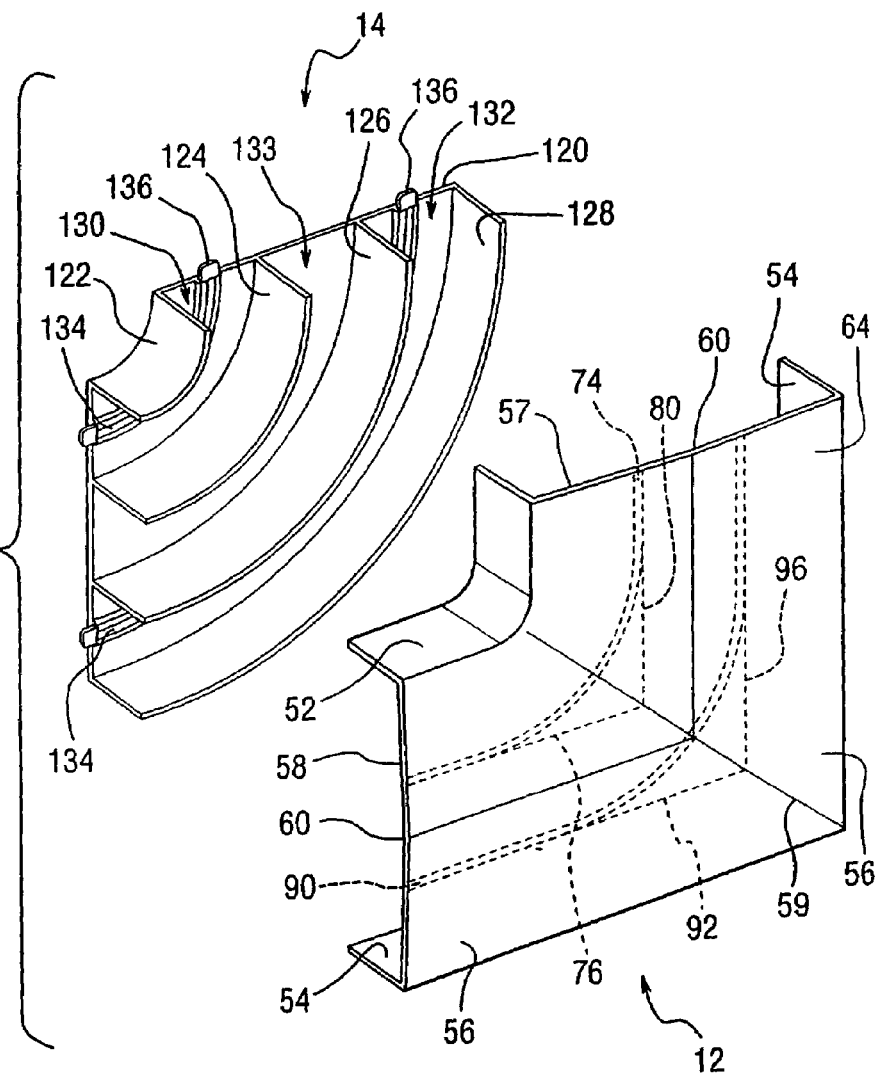
FIG. 5 is an exploded, front, side perspective view of the raceway fitting in FIG. 1, showing the fitting being assembled with a curved base.
Figure 6:
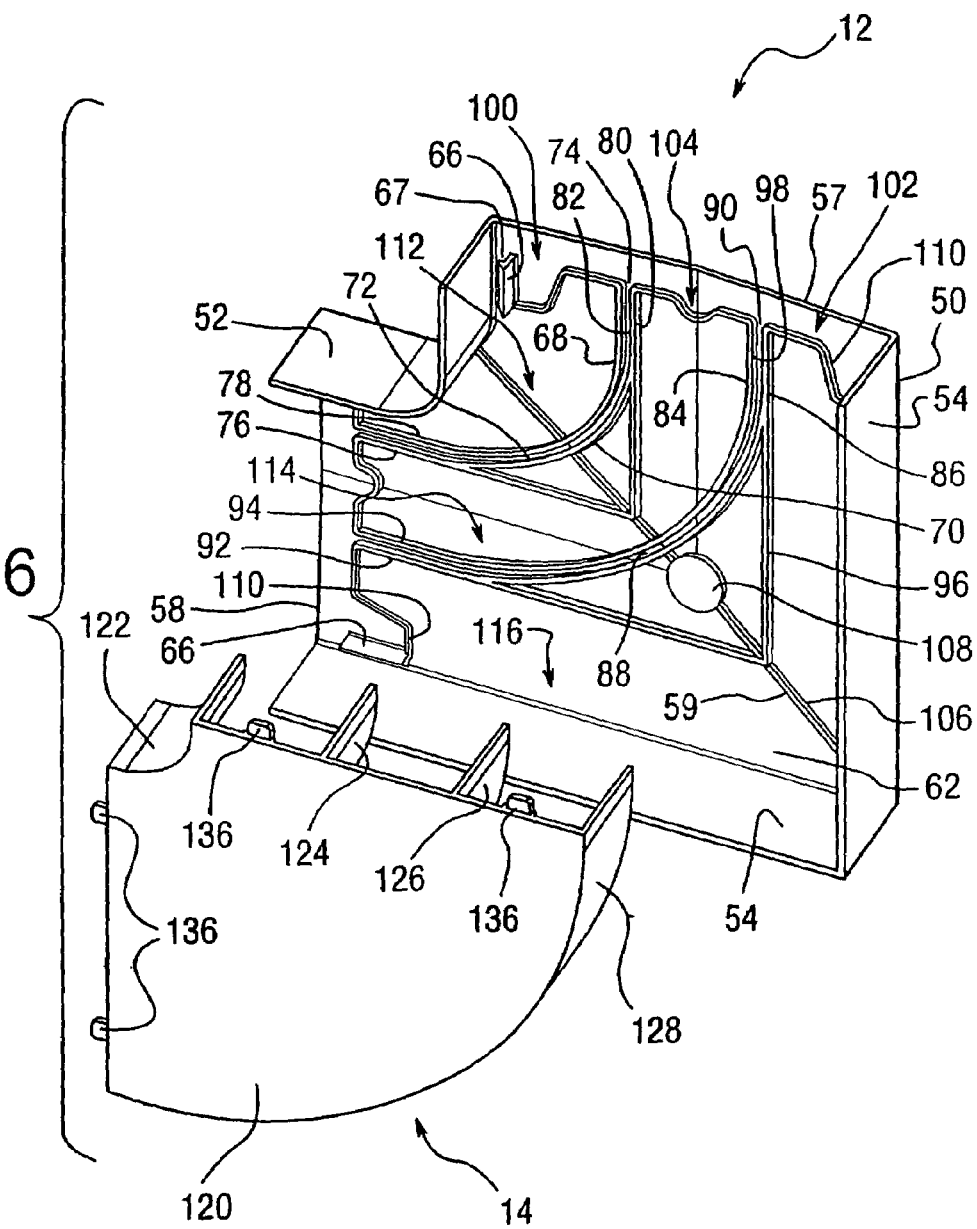
FIG. 6 is a rear, side perspective view of the raceway fitting illustrated in FIG. 1, showing grooves and guide ribs employed in category 5 and non-category 5 applications.

Referring to FIGS. 1–8, a flat elbow or cover fitting 12, according to the first embodiment of the present invention, includes a top 50 and first and second opposing sides 52 and 54 extending from and being substantially perpendicular with cover fitting 12. In particular, top 50 has two sections 56 connected at joint 59 having inner and outer surfaces 62 and 64 forming a substantial L-shape with first side 52 extending from the inner portion of the L and opposing second side extending along the outer portion of the L. Each section 56 further includes a central bend 60 that matches a bend 44 formed in raceway cover 18 allowing first and second ends 57 and 58 of each section 56, respectively, to accommodate raceway 10. A pair of hooks or securing members 66 extend from inner surface 62 and are disposed proximate first and second sides 52 and 54 at first and second ends 57 and 58 for engaging raceway 10, as best seen in FIG. 6.

Cover fitting 12 also includes first and second curved walls 68 and 70 extending along inner surface 62 between ends 57 and 58 proximate first side 52, forming a first segment 72 of a first groove 74, as best seen in FIG. 6. A first guide rib 76 also extends along inner surface 62 from end 57 to joint 59 forming a second segment 78 of first groove 74. Likewise, a second guide rib 80 extends along inner surface 62 from second end 58 to joint 59 abutting the end of first guide rib 76 and forming a third segment 82 of first groove 74.

Similarly, third and fourth curved walls 84 and 86 also extend along inner surface 62 between ends 57 and 58 and spaced from first and second walls 68 and 70, forming a first segment 88 of a second groove 90. Also a third guide rib 92 extends from first end 57 to joint 59 forming a second segment 94 of second groove. Likewise, a fourth guide rib 96 extends from second end 58 to joint 59 abutting third rib 92, forming a third segment 98 of second groove 90.

First and second grooves 74 and 90 define three curved channel sections along inner surface 62, as shown in FIG. 6. In particular, a first outer channel section 100 is defined between first side 52 and first curved wall 68 of first groove 74. A second outer channel section 102 is defined between second side 54 and fourth curved wall 86 of second groove 90. A third middle channel section 104 is defined between second curved wall 70 of first groove 74 and third curved wall 84 of second groove 90.

First and second grooves 74 and 90 of cover fitting 12 are curved to accommodate the curvature of base fitting 14 with first, second, and third channel sections 100, 102, and 104 corresponding to channel sections of base fitting 14, as described below. When base fitting 14 is not employed, first, second, third, and fourth guide ribs 76, 80, 92, 96 define first, second, third guide channels sections 112, 114, and 116 to guide and separate the wires extending from each raceway 10. Specifically, first guide channel section 112 is defined between first side 52 and first and second guide ribs 76 and 80. Second guide channel section 114 is defined between second side 54 and third and fourth guide ribs 92 and 96. Third guide channel section 116 is defined between first and second guide channel sections 112 and 114. Preferably, inner surface 62 of top 50 also includes a strengthening rib 106 extending along joint 59 with a centrally disposed molding depression 108 and support ribs 110 extending from first and second sides 52 and 54 proximate each end 57 and 58.

However, strengthening rib 106 and support ribs 110 are not necessary in employing cover fitting 12. In addition, it is preferable that cover fitting 12 be formed of a unitary one-piece member, but top 50, sections 56, and first and second sides 52 and 54 can be separably made and integrally attached by any known attachment. In addition, it is also preferable that cover fitting 12 be formed of the same material as raceway 10, but these can be formed of any material, including any plastic material.

Referring to FIGS. 4–6, base fitting 14 includes a curve bottom 120 with curved first, second, third, and fourth partitions 122, 124, 126, and 128, extending substantially perpendicularly from bottom 120 with each subsequent partition, from first to fourth, being longer. The partitions form three channel sections which correspond to the channels of raceway 10 and the channel sections of cover fitting 12. Specifically, a first base outer channel section 130 is formed between first partition 122 and second partition 124. A second outer base channel section 132 is formed between third and fourth partitions 126 and 128, and a third inner base channel section 133 is formed between first and second outer base channel sections 130 and 132. First and second base channel sections 130 and 132 each further include a track 134 extending therethrough along inner surface 62, which corresponds to tracks 34 of first and second outer channels 30 of raceway 10, respectively. In addition, a tab 136 extends from each end of each track 134 for engaging tracks 34 of raceway 10 connecting base fitting 14 with raceway 10. The curvature of bottom 120 and partitions 122, 124, 126, and 128 are determined by the required bend radius needed for category 5 wiring when a change of direction occurs, such as when rounding a corner.

Referring to FIGS. 1–8, cover fitting 12 can be employed by itself to connect two mitered raceways 10 as in non-category 5 applications, for holding wires 27 that do not require a certain bend radius, as best seen in FIG. 3. Alternatively, cover fitting 12 can be employed with base fitting 14 as in category 5 applications, for holding wires 29 that do require a certain bend radius, as best seen in FIG. 4. In both instances, cover fitting 12 directly engages each raceway 10.

In applications such as non-category 5 applications, the two raceways 10 are mitered and their ends abut one another forming a right angle or L, as seen in FIG. 3. Cover fitting 12 connects the two raceways 10 by snap fitting cover fitting 12 over each raceway base 16 by releasably engaging hooks 66 with lips 24 of each raceway base fitting 16, as seen in FIG. 7, such that one of the raceways extends through first end 57 of cover fitting 12 and the other raceway extends through second end 58. Each hook 66 has a stop member 61 that abuts the top of lip 24 restricting the movement of raceway 10 with respect to cover fitting 12. Although it is preferable to employ a snap fit, any known type of attachment means can be used to engage the cover fitting 12 with each raceway 10.

Prior to this engagement, a portion of raceway cover 18 must be cut away to allow access to lip 24 such that only the very end of cover fitting 12 covers raceway cover 18. The rest of cover fitting 12 covers the raceway base 16 of each raceway 10 leaving a small space between support members 28 and top 50 with first and second sides 52 and 54 overlapping each sidewall 22 of each raceway 10, respectively. First and second outer guide channels sections 112 and 114 defined along inner surface 62 of cover fitting 12 correspond to first and second outer raceway channels 30 of each raceway 10. Similarly, third inner guide channel section 116 corresponds to middle raceway channel 32. The guide channel sections of cover fitting 12 operate to guide and maintain separate the wires 27 held within their respective raceway channels when extended through the fitting. Although only one wire 27 is shown per guide channel section 112, 114, and 116 of cover fitting 12, any number of wires can be held within each guide channel section 112, 114, 116, or each channel can be filled to capacity with wires.

In applications such as category-5 applications, the two raceways 10 are cut at a straight angle at their ends 31, rather than mitered, and are spaced from one another such that only a portion of each respective raceway 10 extends into cover fitting 12, as best seen in FIG. 4. Cover fitting 12 connects the two raceways 10 in the same manner as described above for applications such as non-category 5 applications after a portion of each raceway cover 18 has been removed. However, when dealing with category 5-type wiring, base fitting 14 must be employed to prevent damage to the wiring. In particular, base fitting 14 is disposed between the ends of each raceway 10 with tabs 136 being received in tracks 34 of each raceway base 16, connecting base fitting 14 to each raceway 10.

In addition, as seen in FIG. 8, cover fitting 12 covers base fitting 14 such that second and third partitions 124 and 126 are received in first and second grooves 74 and 90, respectively, and first and second sides 52 and 54 overlap both sidewalls 22 of each raceway 10 and first and fourth partitions 122 and 128 of base fitting 14, restricting the movement of base fitting 14 with respect to cover fitting 12. First and second base channel sections 130 and 132 correspond to first and second outer channel sections 100 and 102 of cover fitting 12 and middle base channel section 133 corresponds to middle channel section 104. The channel sections of cover fitting 12 and base fitting 14 form three channels which correspond to the raceway channels of each raceway 10 keeping the wires 29 of each raceway channel separate as they extend through cover fitting 12 and base fitting 14. Although only one wire 29 is shown per channel, any number of wires can be held within each channel, or each channel can be filled to capacity with wires.

Figure 9:
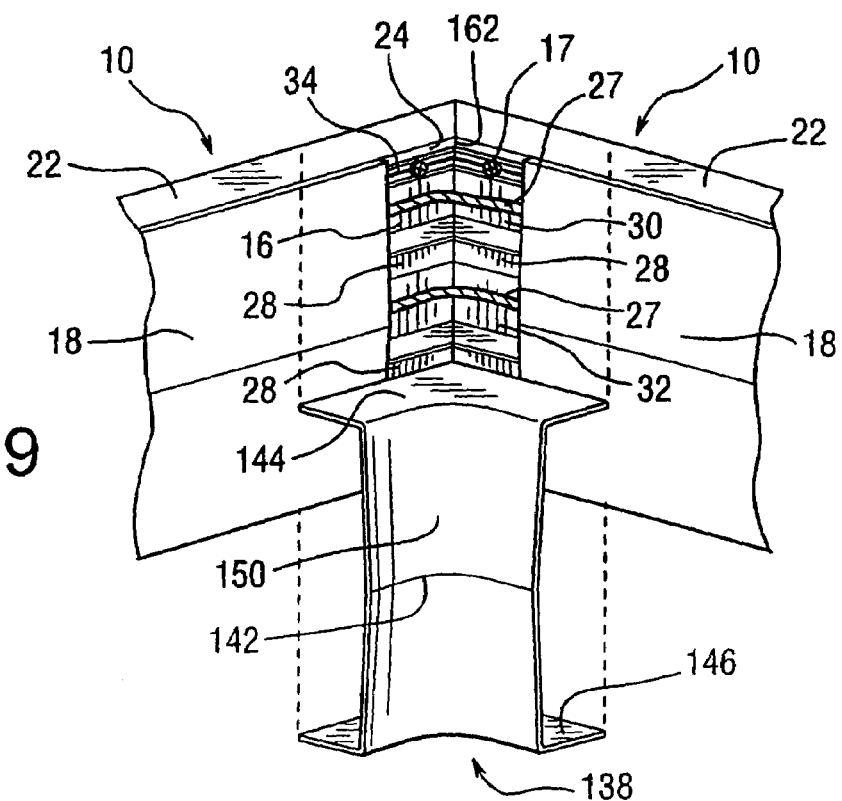
FIG. 9 is an exploded, front, top perspective view of a raceway fitting according to a second embodiment of the invention, illustrating the fitting being connected to two mitered raceways.
Figure 10:
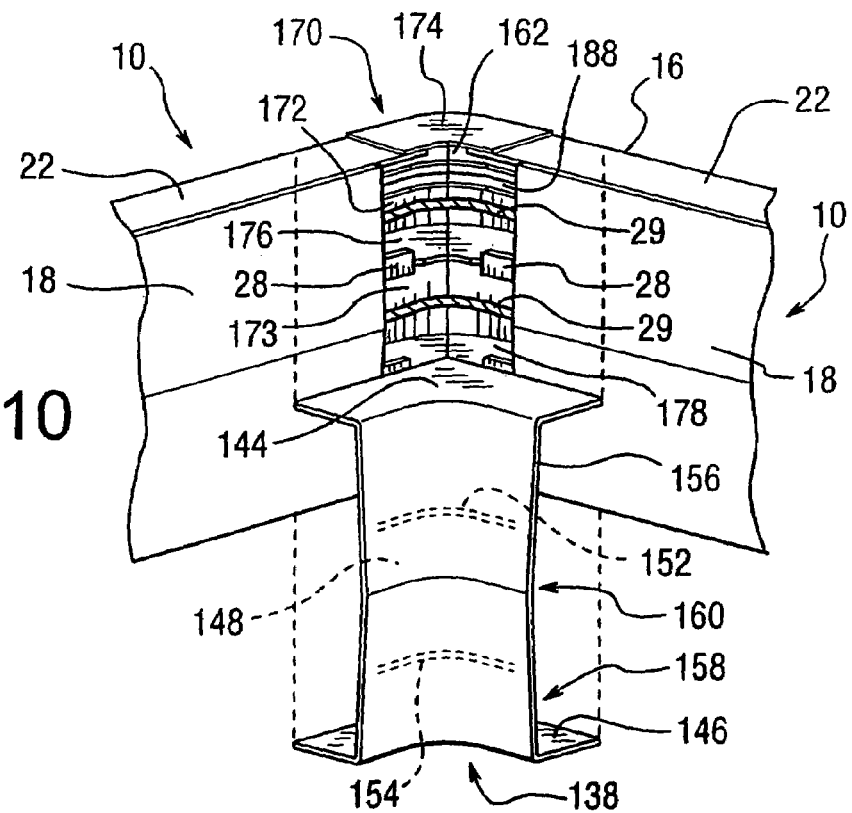
FIG. 10 is an exploded, front, top perspective view of the raceway fitting illustrated in FIG. 9, showing the fitting being connected to two non-mitered raceways with a base therebetween.
Figure 11:
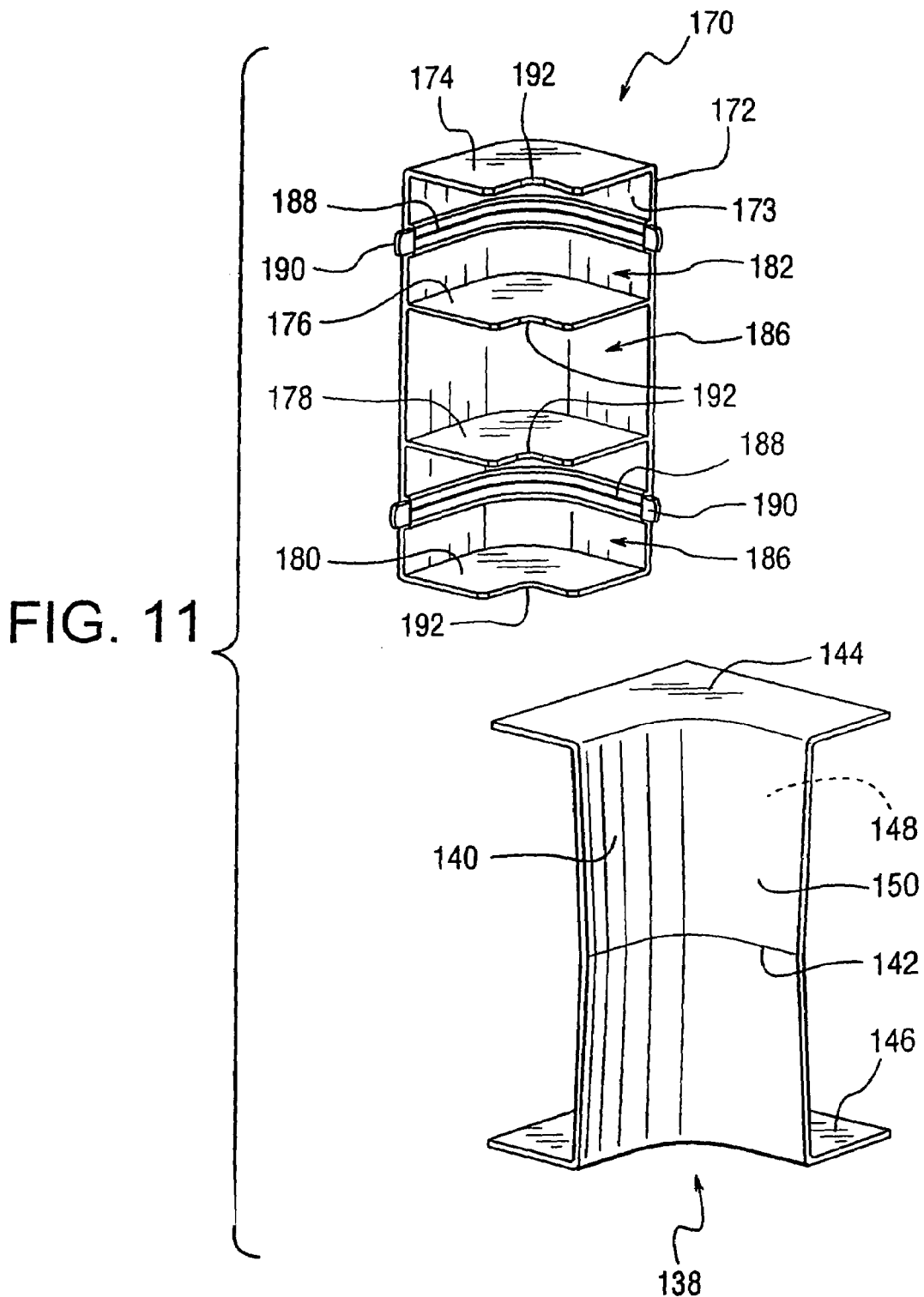
FIG. 11 is an exploded, front, top perspective view of the raceway fitting in FIG. 9, showing the fitting with a curved base.

Referring to FIGS. 9–11, an internal elbow or cover fitting 138, according to a second embodiment of the present invention, includes a top 140 and first and second opposing sides 144 and 146 extending from opposing ends of cover fitting 138, similar to cover fitting 12. However, unlike top 50 of cover fitting 12, top 140 is formed of one section having a convex inner surface 148 and a concave outer surface 150. First and second sides 144 and 146 extend from inner surface 148 and are curved to match the curvature of top 140. This allows cover-fitting 138 to connect two raceways 10 when they converge to a corner forming an acute angle 162 therebetween, since the curvature of top 140 and first and second sides 144 and 146 corresponds to the acute angle 162, as best seen in FIGS. 9 and 10, such that top 140 covers each raceway base 16 and first and second sides 144 and 146 overlap the sidewalls 22 of each raceway base 16.

As with cover fitting 12, cover-fitting 138 has hooks that engage each lip 24 of each raceway base 16 and a central bend 142 disposed laterally across top 140 that accommodates bend 44 of each raceway 10 upon assembling cover fitting 138 with raceways 10. In addition, cover fitting 138 includes first and second grooves 152 and 154 which extend laterally across inner surface 148. First and second grooves 152 and 154 are spaced from one another on either side of central bend 142 forming a first outer channel section 156 between first side 144 and first groove 152, a second outer channel section 158 between second side 146 and second groove 154, and a middle channel section 160 defined between first and second channel sections 156 and 158.

In non-category 5-type applications, cover fitting 138 connects two mitered raceways 10 in the same manner as described above for cover fitting 12. However, unlike cover fitting 12, the channel sections 156, 158, and 160 of cover fitting 138 correspond to raceway channels 30 and 32 of each raceway 10 upon mating cover fitting 138 with each raceway 10. Thus the need for guide ribs as used with cover fitting 12 is eliminated. Each channel section 156, 158, and 160 hold wires 27, which do not require a certain bend radius.

In category 5-type applications, an internal base fitting 170 must be used with cover fitting 138 to provide the appropriate bend radius for wires 29, as discussed above with respect to cover fitting 12 and base fitting 14.

Base fitting 170 includes a bottom 172 with a concave inner surface 173 that matches convex inner surface 148 of cover fitting 138 and acute angle 162, such that base fitting 170 can be inserted between raceways 10 in the same manner as described above for base fitting 14, as best seen in FIG. 10. Similar to base fitting 14, base fitting 170 has curved first, second, third, and fourth partitions 174, 176, 178, and 180 extending substantially perpendicularly from bottom 172 and each has a curvature that matches the curvature of bottom 172. Partitions 174, 176, 178, and 180 form three channel sections which correspond to the channels of raceway 10 and the channel sections of cover fitting 138. Specifically, a first base outer channel section 182 is formed between first partition 174 and second partition 176. A second outer base channel section 184 is formed between third and fourth partitions 178 and 180, and a third inner base channel section 186 is formed between first and second outer base channel sections 182 and 184. First and second base channel sections 182 and 184 correspond to first and second outer channel sections 156 and 158 of cover fitting 138 and third inner base channel section 186 corresponds to middle channel section 160.

Upon assembling cover fitting 138 and base fitting 170, the channel sections of cover fitting 138 and base fitting 170 form three channels which correspond to the raceway channels 30 and 32 keeping the wires of each raceway channel separate as they extend through the cover fitting 138 and the base fitting 170. In addition, second and third partitions 176 and 178 of base fitting 170 are received in first and second grooves 152 and 154 of cover fitting 138, and first and second sides 144 and 146 of cover fitting 138 overlap first and fourth partitions 174 and 180, respectively. Each partition 174, 176, 178, and 180 further includes a cut out portion 192 that is shaped to accommodate convex inner surface 148 of cover fitting such that each cut out portion 192 abuts inner surface 148. Also, base fitting 170 is connected to each raceway 10 in the same manner as base fitting 14. Specifically, first and second base channel sections 182 and 184 of base fitting 170 each include a track 188 extending therethrough which corresponds to tracks 34 of first and second outer channels 30 of each raceway 10, respectively. In addition, a tab 190 extends from each end of each track 188 and is received in tracks 34 connecting base fitting 170 to each raceway 10.

Figure 12:
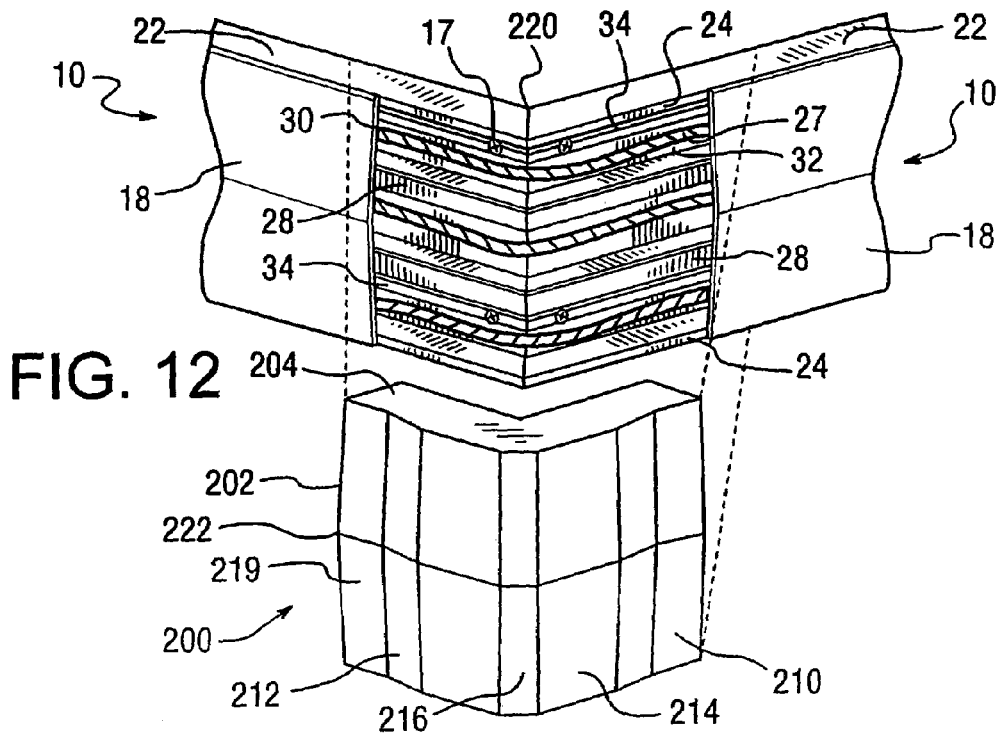
FIG. 12 is an exploded, front, top perspective view of a raceway fitting according to a third embodiment of the invention, illustrating the fitting being connected to two mitered raceways.
Figure 13:
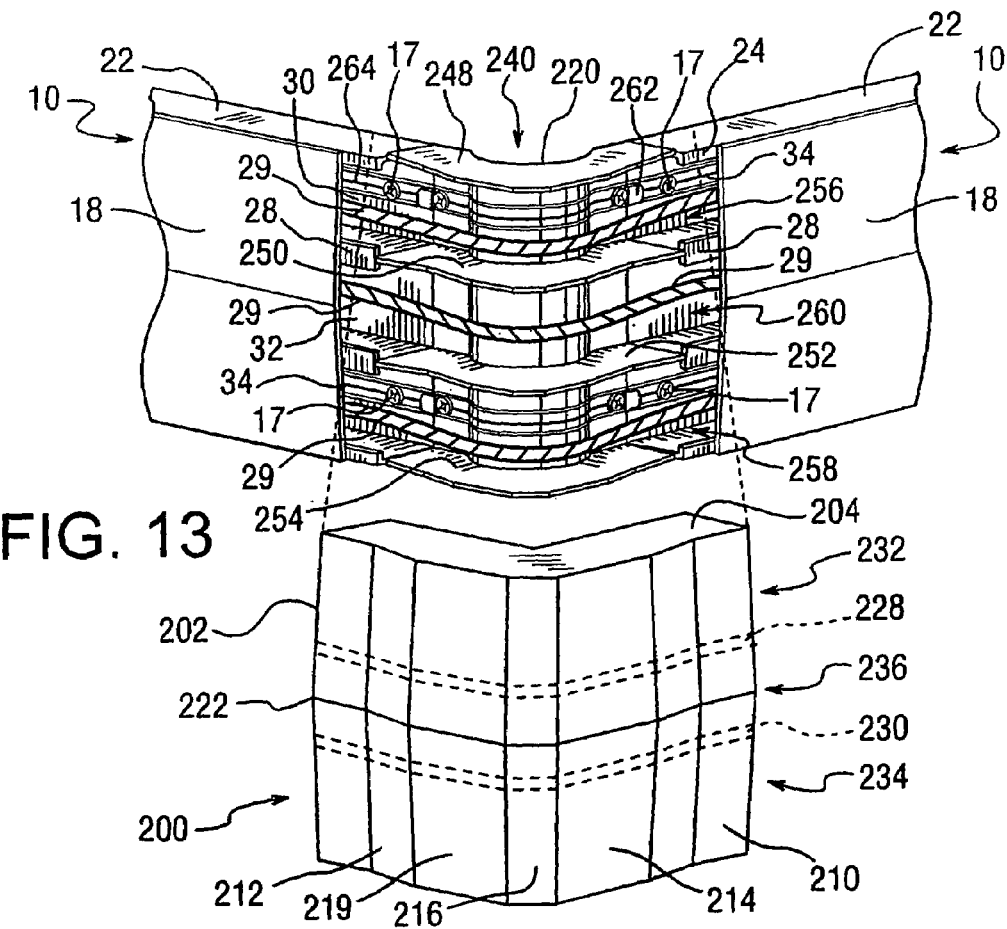
FIG. 13 is an exploded, front, top perspective view of the raceway fitting illustrated in FIG. 12, showing the fitting being connected to two non-mitered raceways with a base therebetween.

Referring to FIGS. 12–14, an external elbow or cover fitting 200, according to a third embodiment of the present invention, which like cover fitting 12 and cover fitting 138, includes a top 202 and first and second opposing sides 204 and 206 extending from opposing ends of cover fitting 200, as best seen in FIG. 14.

Top 202 is formed of two sections 208 with each section having a first flat portion 210, a second ramp portion 212, and a third larger ramp portion 214. A flat central portion 216 connects the two sections 208 forming a substantially V-shaped top 202 wherein the inner surface 218 forms the inner portion of the V and the outer surface 219 forms the outer portion of the V, as best seen in FIG. 14. First and second sides 204 and 206 extend from inner surface 218 and are similarly V-shaped. This allows cover-fitting 200 to connect two raceways 10 when they converge to a corner forming an obtuse angle 220 therebetween, since the V-shape of top 202 matches obtuse angle 220, as best seen in FIGS. 12 and 13, such that top 202 covers each raceway base 16 and first and second sides 204 and 206 overlap the sidewalls 22 of each raceway base 16.

As with cover fittings 12 and 138, cover fitting 200 engages raceway base 16 with hooks that connect to each lip 24 of each raceway base 16. Cover fitting 200 also includes a central bend 222 disposed laterally across top 202 that, like cover fittings 12 and 138, accommodates bend 44 of each raceway 10 upon assembling cover fitting 200 with raceways 10. In addition, cover fitting 202 includes first and second grooves 228 and 230 which extend laterally across inner surface 148 and form first and second outer channel sections 232 and 234 and a middle channel section 236 in the same manner as first and second grooves 152 and 154 of cover fitting 138. Like cover fitting 138, in non-category 5 applications the channel sections 232, 234, and 236 directly correspond to the channels 30 and 32 of each raceway 10 to separate the wires 27 within each respective channel.

In category 5-type applications, an external base fitting 240 must be used with cover fitting 200 to provide the appropriate bend radius. Base fitting 240 includes a bottom 242 having a convex mid portion 244 and two curved outer portions 246 extending from mid portion 244 forming a substantial V-shaped bottom 242, such that the inner surface 243 forms the outer portion of the V and the outer surface forms the inner surface of the V inner surface to corresponding to cover fitting 200 and obtuse angle 220. This allows base fitting 240 to be inserted between raceways 10 in the same manner as described above for base fitting 170, by employing tabs 262 that extend from tracks 264, as best seen in FIGS. 13 and 14.

Similar to base fitting 170, base fitting 240 has curved first, second, third, and fourth partitions 248, 250, 252, and 254 extending from inner surface 243 of bottom 242 and each is substantially V-shaped to match the curvature of inner surface 243. Like the partitions of base fitting 170, partitions 248, 250, 252, and 254 form first and second base outer channel sections 256 and 258, and a third inner base channel section 260 in the same manner. Also, first and second base channel sections 256 and 258 correspond to first and second outer channel sections 232 and 234 of cover fitting 200 and third inner base channel section 260 corresponds to middle channel section 236.

As with cover fitting 138 and base fitting 170, upon assembling cover fitting 200 and base fitting 240, the channel sections of each fitting form three channels that correspond to the channels 30 and 32 of each raceway 10 for holding wires 29. In addition, second and third partitions 250 and 252 are received in first and second grooves 228 and 230 of cover fitting 200, and first and second sides 204 and 206 of cover fitting 200 overlap first and fourth partitions 248 and 254, respectively. First and fourth partitions 248 and 254 further each include a flat end 266 that accommodates and abuts central portion 216 of cover fitting 200.

By designing cover fittings 12, 138, and 200 in the fashion described above, two substantially identical cover fittings can be used for two different applications. For example, with first and second cover fittings that are substantially identical, the first cover fitting can be employed on a raceway that is mitered and the second cover fitting can be used with a base fitting on a non-mitered raceway carrying, for example, category 5 wires. Thus, manufacturing costs are reduced by requiring only one mold to make both the first and second cover fittings and efficiency is increased since the same cover fitting can be used for both applications requiring bends, such as with category 5, and with applications not requiring bends, such as with non-category 5 applications.

While particular embodiments have been chosen to illustrate the invention, it will be understood by those skilled in the art that various changes and modifications can be made therein without departing from the scope of the invention as defined in the appended claims.

What is claim is:

1. A raceway assembly comprising:
   a first raceway having a longitudinal dimension, a bottom wall, opposite side walls extending away from said bottom wall, at least one intermediate wall extending away from said bottom wall and substantially parallel to said side walls to form at least two channels, and a cover removably coupled to said opposite side walls to enclose each of said channels, said first raceway further having a first end and second end;
   a second raceway having a longitudinal dimension, a bottom wall, opposite side walls extending away from said bottom wall, at least one intermediate wall extending away from said bottom wall and substantially parallel to said side walls to form at least two channels, and a cover removably coupled to said opposite side walls to enclose each of said channels, said second raceway having a first end and second end;
   a base member having a bottom wall, a first end with a first coupling tab coupled to said first raceway and a second end with a second coupling tab coupled to said second raceway, a first curved side wall, a second curved side wall and a curved intermediate wall between said side walls to form at least two channels, said bottom wall having a pair of ribs defining a guide groove for guiding wires; and
   a first corner cover fitting member having a top wall with an inner surface, opposite side walls extending from said inner surface, a first open end and a second open end where said second open end is substantially perpendicular to said first open end, a plurality of coupling members for coupling said corner cover member to said first and second raceways, a stop member extending from said inner surface and positioned between said coupling member and a respective side wall, each said stop member having a dimension to contact a top edge of said side wall of said respective raceway and to space said top wall of said corner cover member from said side wall of said respective raceway whereby said top wall of said cover corner member overlies a portion of said cover of said first and second raceways, first and second curved ribs extending along said inner surface forming a groove therebetween receiving a top edge of said intermediate wall.

2. The raceway assembly of claim 1, wherein said intermediate wall of said corner base member has a height that is greater than a height of said intermediate wall of said first and second raceways.

3. The raceway assembly of claim 1, wherein said first and second curved ribs have a first end spaced from said first end of said cover fitting, and a second end spaced from said second end of said cover fitting.

4. The raceway assembly of claim 1, wherein said bottom wall of said base member has a first portion lying in a first plane and a second portion lying in a second plane that is substantially perpendicular to said first plane.

5. The raceway assembly of claim 4, wherein said first portion and said second portion of said bottom wall ware adapted to be received in an inside corner of a wall.

6. The raceway assembly of claim 4, wherein said first portion and said second portion of said bottom wall are adapted to be received on an outside corner of a wall.

7. The raceway assembly of claim 1, wherein said first end and second end of said bottom wall are perpendicular to each other.

8. A raceway assembly comprising:
   a first raceway having a longitudinal dimension, a bottom wall, opposite side walls extending away from said bottom wall, at least one intermediate wall extending away from said bottom wall and substantially parallel to said side walls to form at least two channels, and a cover removably coupled to said opposite side walls to enclose each of said channels, said first raceway further having a first end and a second end;
   a second raceway having a longitudinal dimension, a bottom wall, opposite side walls extending away from said bottom wall, at least one intermediate wall extending away from said bottom wall and substantially parallel to said side walls to form at least two channels, and a cover removably coupled to said opposite side walls to enclose each of said channels, said second raceway having a first end and a second end;
   a base member having a first end with a first coupling tab coupled to said first raceway and a second end with a second coupling tab coupled to said second raceway, a first curved wall, a second curved wall and a curved intermediate wall between said curved first and second walls;
   a corner cover fitting member having a top wall with an inner surface, opposite side walls extending from said inner surface, a first open end and a second open end where said second open end is substantially perpendicular to said first open end, a plurality of coupling members for coupling said corner cover member to said first and second raceways, a stop member extending from said inner surface and positioned between said coupling member and a respective side wall, each said stop member having a dimension to contact a top edge of said side wall of said respective raceway and to space said top wall of said corner cover member from said side wall of said respective raceway whereby said top wall of said cover corner member overlies a portion of said cover of said first and second raceways, first and second ribs forming a groove therebetween receiving a top edge of said intermediate wall, a first guide rib extending along said inner surface from said first open end and adjacent said first rib and a second guide rib extending along said inner surface from said second open end adjacent said first rib and intersecting with said first guide rib, said first and second guide ribs being positioned to guide wires through said channels.

9. The raceway assembly of claim 8, wherein said bottom wall of said base member has a first portion lying in a first plane and a second portion lying in a second plane that is substantially perpendicular to said first plane.

10. The raceway assembly of claim 9, wherein said first portion and said second portion of said bottom wall ware adapted to be received in an inside corner of a wall.

11. The raceway assembly of claim 9, wherein said first portion and said second portion of said bottom wall are adapted to be received on an outside corner of a wall.

12. The raceway assembly of claim 8, wherein said first end and second end of said bottom wall are perpendicular to each other.

13. A method of forming a raceway from a raceway assembly comprising:

joining a first end of a first raceway to a first end of a base member, said first raceway having a longitudinal dimension, a bottom wall, opposite side walls extending away from said bottom wall, an intermediate wall extending away from said bottom wall and substantially parallel to said side walls to form at least two channels, and a cover removably coupled to said opposite side walls to enclose each of said channels, said first raceway further having a first end, and said base member having a first end coupled to said first raceway and a second end coupled to said second raceway, a first curved side wall, a second curved side wall and a curved intermediate wall between said side walls;

coupling the second end of the base member to a first end of a second raceway, said second raceway having a longitudinal dimension, a bottom wall, opposite side walls extending away from said bottom wall, an intermediate wall extending away from said bottom wall and substantially parallel to said side walls to form at least two channels, and a cover removably coupled to said opposite side walls to enclose each of said channels;

coupling a corner cover member to said base member, said corner cover fitting member having a top wall with an inner surface, opposite side walls extending from said inner surface, a first open end and a second open end where said second open end is substantially perpendicular to said first open end, a plurality of coupling members for coupling said corner cover member to said first and second raceways, a stop member extending from said inner surface and positioned between said coupling member and a respective side wall, each said stop member having a dimension to contact a top edge of said side wall of said respective raceway and to space said top wall of said corner cover member from said side wall of said respective raceway whereby said top wall of said cover corner member overlies a portion of said cover of said first and second raceways, first and second curved ribs extending along said inner surface forming a groove therebetween receiving a top edge of said intermediate wall, a first substantially straight guide rib extending along said inner surface from said first open end and adjacent said first curved rib and a second guide rib extending along said inner surface from said second open end adjacent said first curved rib and intersecting with said first guide rib, said first and second guide ribs being positioned to guide wires through said channels.

* * * * *